Oct. 19, 1965    A. G. CLARK    3,212,199
TEACHING MACHINE
Filed July 12, 1961    5 Sheets-Sheet 1

INVENTOR
Albert G. Clark,
BY Alfred B. Levine
ATTORNEY

Oct. 19, 1965  A. G. CLARK  3,212,199
TEACHING MACHINE
Filed July 12, 1961  5 Sheets-Sheet 2

INVENTOR
Albert G. Clark,
BY
Alfred B. Levine
ATTORNEYS

Oct. 19, 1965

A. G. CLARK

3,212,199

TEACHING MACHINE

Filed July 12, 1961

INVENTOR
Albert G. Clark,

BY Alfred B. Levine

ATTORNEYS

Oct. 19, 1965   A. G. CLARK   3,212,199
TEACHING MACHINE
Filed July 12, 1961   5 Sheets-Sheet 4

INVENTOR
Albert G. Clark,
BY Alfred B. Levine
ATTORNEYS

Oct. 19, 1965    A. G. CLARK    3,212,199
TEACHING MACHINE
Filed July 12, 1961    5 Sheets-Sheet 5

INVENTOR
Albert G. Clark
BY Alfred B. Levine
ATTORNEYS

United States Patent Office

3,212,199
Patented Oct. 19, 1965

3,212,199
TEACHING MACHINE
Albert G. Clark, Bethesda, Md., assignor to Litton Systems, Incorporated, College Park, Md.
Filed July 12, 1961, Ser. No. 123,573
25 Claims. (Cl. 35—9)

This invention generally relates to improvements in teaching machines and has for a principal object to provide an economical, general purpose teaching machine that may utilize any of several effective teaching methods including multiple choice, written response and response controlled stimulus.

It is a further object of the invention to provide such a teaching machine having the following features:

(1) That stores a relatively large amount of information or educational stimulus in the form of a series of individual cards for successive presentation to the student.

(2) Wherein each card for viewing by the student is relatively large in size to provide more space for verbal and pictorial stimulus.

(3) Wherein the sequence or program of presenting the cards may be easily varied by the instructor whether the machine operates in a preprogrammed manner or whether this sequence is controlled according to the response of the student.

(4) That permits the instructor to easily change all of the cards together and substitute a new set, or substitute any one or more of the cards individually without disturbing the others.

(5) Wherein each card may be obtained in printed form from a publisher of such educational cards, or may be obtained in blank form and prepared or revised by the teacher supervising the use of the machine to provide an individually tailored program for the student.

(6) That recognizes the response of the student and rewards his effort in a manner adjudged by educational psychologists to promote the learning processes.

(7) That maintains a record of the student's correct answers and responses, both as a reward factor, and for evaluation of the program by the teacher or educator, and further permits an additional record to be maintained of the individual responses to each card for later evaluation by the teacher.

Still a further object of the invention is to provide a machine having the above and additional features that is relatively small, lightweight and portable; relatively low in cost; and easily and inexpensively serviced and repaired where necessary.

To provide those other desirable features according to the invention, there is provided a teaching machine for internally storing a relatively large number of educational cards and successively presenting these cards individually or otherwise, before a viewing window for observation and stimulus to the student. Each of the individual cards is relatively large in size to provide large spaces for presenting visual or pictorial data, and/or to provide adequate space for written response. For enabling the cards to be compactly stored, selected and fed through the machine, as controlled either manually or automatically, the cards are each individually and detachably supported on a novel transport belt carrier that is adapted to be folded and unfolded in accordion-like fashion as the belt is driven through the machine. This manner of supporting and feeding the individual cards on a carrier belt provides the more economical and functional advantages possessed by teaching machines using a continuous information tape while additionally possessing all the educational advantages of teaching machines using individual cards.

More specifically, the known type of education teaching machines using a continuous programmed tape bearing the stimulus information are considerably less expensive and less complex than are the teaching machines using individual cards due to the greater complexity of the known card sorting and feeding mechanisms as opposed to the relative simplicity of drive rollers and the like for a tape drive. On the other hand, the card feeding machines offer the advantages from the Educator's point of view of providing greater flexibility, since the cards may be rearranged in different sequences, and individual ones of the cards may be added, substituted, edited or even originated by the teacher, whereas these changes cannot be easily made in a printed tape that extends for many feet in length. Additionally, in the tape handling machines, the teacher cannot easily originate his own tape without considerable difficulty. For these reasons, it is desired to provide a teaching machine having the educational advantages of the card feeding machines coupled with the economical advantages possessed by the tape feeding machines.

According to further features of the invention there is also provided such a machine that may be motor driven or hand crank driven and that is adaptable for feeding either a preprogrammed sequence of cards or a modified sequence depending upon the individual ability of the student. In the preferred preprogrammed embodiments, the machine may be adapted for teaching by means of multiple choice question and answers or by means of written responses of the student. Where the student is more advanced, the machine may be adjusted to skip an adjustably fixed number of frames at the discretion of the teacher, whereas where the student is still working in fundamentals, the machine may be adjusted to present each succeeding frame in sequence to the student.

According to still further features of the invention, the preferred machine embodies means for rewarding the correct responses of the student in a manner considered by present psychological theories as being desirable. In the multiple choice question and answer mode of operation of the machine, the reward is presented in the form of a visual indication or audible signal in response to each correct answer together with the machine being conditioned to advance to a succeeding card or frame. Additionally, a counter is provided to count each correct answer made on the first response of the student whereby the student is continuously provided with a record of the number of his correct scores. In the written response mode of operation of the machine, a hidden answer is revealed from a succeeding card for comparison with the student's written answer whereby the student is immediately informed of the correct answer as is desired. In this latter modification, means are also provided for enabling the student to grade the correctness of his own answer, thereby requiring the student to compare and grade his answer with the correct answer.

As a still further optional feature of the machine, means are provided, in the multiple choice mode of operation of the machine, for recording the number of incorrect responses of the student to each question. In one preferred form, these means are embodied as a continuous miniaturized tape bearing a readily identifiable code that records the incorrect answers for each card whereby the tape may be quickly evaluated by the teacher. Since this feature is of prime value to the educator in testing the program, rather than to the student, it is embodied as an optional attachment that may be easily added to or removed from the machine.

Many additional features and objects will be more readily understood by those skilled in the art after a detailed consideration of the following preferred embodiments of the invention taken with the accompanying drawings wherein.

Figures 1, 2, 3, 4:
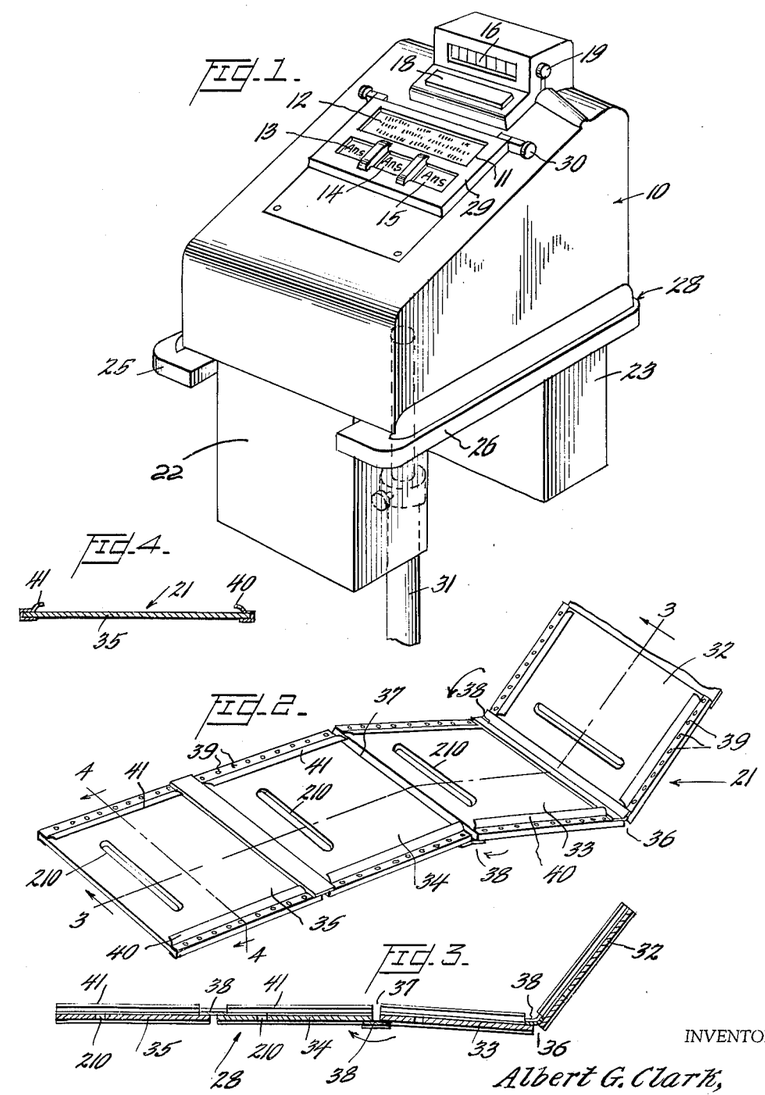
FIG. 1 is a perspective view illustrating the machine housing, the controls, the score counter, and other features of one preferred embodiment of the invention operating in the multiple choice question and answer mode.
FIG. 2 is a perspective view of a short section of the preferred card carrier belt according to the invention for storing and feeding the individual cards.
FIGS. 3 and 4 are cross-sectional views of FIG. 2 taken along lines 3—3 and 4—4, respectively.

Referring now to the drawings, and initially to FIGS. 1 to 10, for a detailed consideration of one preferred embodiment of the invention operating in the multiple choice question and answer mode, there is shown in FIG. 1 the outer housing 10 and other visible parts of the machine in the form as presented to the student. As shown, the machine is provided with an enlarged viewing window 11 on its upper surface through which a written question 12, pictorial illustration, or like stimulus on a card may be viewed by the student. Immediately below this window 11, there is provided a row of three or more transparent, depressible buttons 13, 14 and 15 beneath each of which a written answer or other response indicia on the card may be viewed, only one of which is the correct response to the stimulus. Any of the three buttons 13, 14 and 15 may be depressed by the student as his response to the stimulus 12; and in the event that the correct response is made, a light indicator is energized beneath that button, thereby immediately rewarding the student for a correct response. On the other hand, if either of the incorrect buttons is depressed, the indicators beneath these latter buttons are not energized and the student must depress the remaining button or buttons until he observes the light, indicating a correct response.

To serve as an additional reward, as well as providing the student with a continuous score of his correct responses, there is also provided a digit counter 16, located on the upper face of the housing 10, and above the viewing window 12. The counter 16 is automatically operated to add one count or digit for each card only if the student depresses the correct one of the buttons 13, 14 or 15 on the first try whereby the student may observe his score of correct responses during and after completing the program by observing the accumulated score of correct responses registered on the counter 15. After the program of cards is completed, the counter may be manually reset by actuating a reset handle 19 located at the right of the counter 16.

To further insure that the student is made aware of the correct response to each question and is rewarded, the card remains beneath the window 11 and the transparent buttons 13, 14, 15, until the correct response button is depressed, and only at this time is the machine conditioned to advance the next card beneath the window 11 and transport the card previously beneath the window 11 into its storage position.

If desired, the machine may also be provided with an independent control button 18 that when depressed automatically operates the mechanism to advance the cards.

Figures 5, 6, 7:
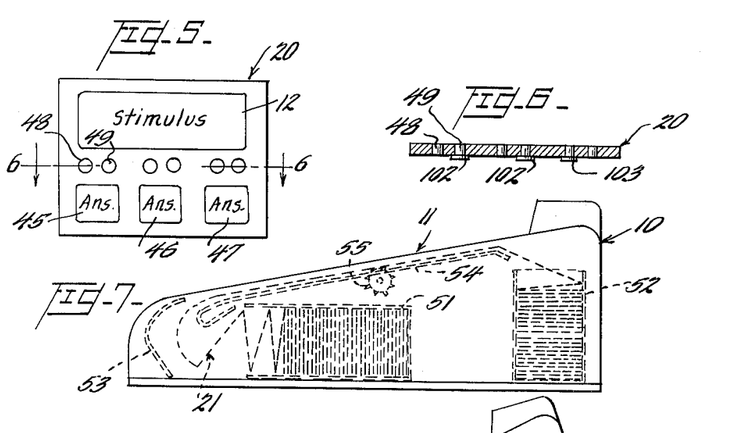
FIG. 5 is a plan view of a preferred educational card construction used in the multiple choice mode of operation of the machine.
FIG. 6 is a cross-section taken through lines 6—6 of FIG. 5.
FIGS. 7 and 8 are schematic sectional views, illustrating different constructions of the machine for storing and feeding different numbers of cards.

Accordingly to this first embodiment of the invention, each of the questions and multiple choice answers, being successively presented under the viewing window 11 and buttons 13, 14, and 15, are disposed on a separate card 20 of the type illustrated in FIG. 5, with a series of such cards being supported along the length of an elongated foldable carrier belt member 21 as shown in FIGS. 2 to 4. As best shown in the similar embodiment of FIG. 8, the carrier belt 21 is constructed to fold and unfold in accordion pleats or in a fan-folded fashion to store a large number of such information cards 20, one above the other, in a feed storage tank or magazine 22 supported below the housing 10 at the front position thereof, as shown.

Figures 8, 9:
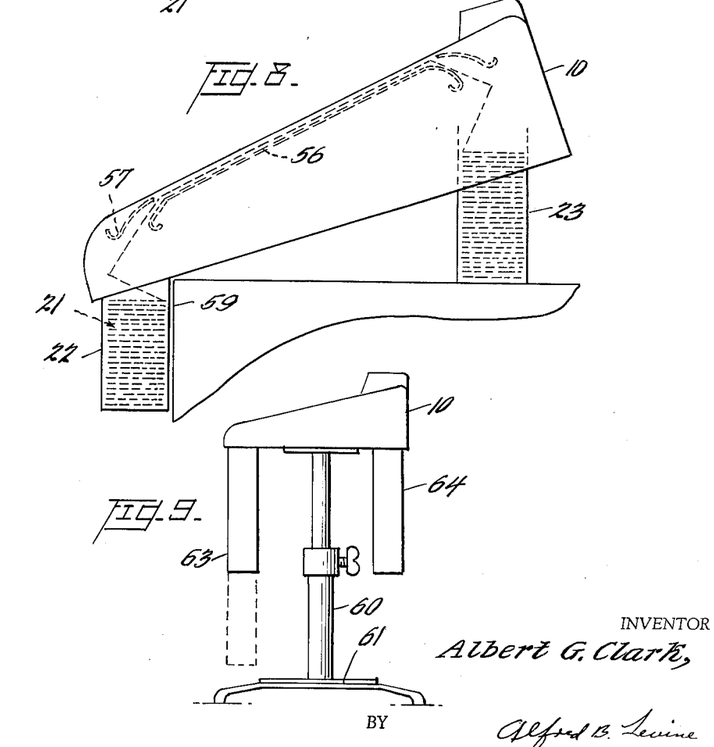
FIG. 9 is a side elevational view illustrating a self-supporting machine having detachable magazines for card storage.

This carrier belt 21 is adapted to be successively unfolded and fed and advanced through the machine, bringing each information card 20, in sequence, beneath the viewing window 11 and transparent buttons 13, 14 and 15. At the viewing window 11, the transporting mechanism is stopped and dwells for each card 20 until the student makes the correct response as discussed above, whereupon the transport belt 21 is then reengaged to advance that card 20 toward the rear receiving magazine 23 located beneath the housing 10 in the rear thereof. At this rear storage magazine 23, the carrier 21 is lowered to again become folded in storage, in accordion folded fashion, to stack the cards 20 one above the other, as best shown in FIG. 8.

Returning to FIG. 1, the feeding magazine 22 and receiving magazine 23 are each adapted to be detachably supported by the base member or members 25 and 26 also serving as a support for the housing 10, whereby these magazines 22 and 23 may be easily removed and replaced, as desired, for substituting a new carrier belt 21 and cards 20 into the machine. The main body of hollow housing 10 is also adapted to be hingedly supported at its rear portion 28 (not shown) to the base members 25 and 26 for ease in assembling and reassembling the magazines 22 and 23, and for inserting and threading the card carrier belt 21 into engagement with its transport mechanism as will be more fully disclosed hereafter.

As shown, the viewing window position 11 and transparent buttons 13, 14 and 15 are all disposed in a top plate member 29 that is pivotally connected to the upper face of the housing by a hinge 30, whereby the top plate 29 may be raised and lowered for access to the carrier belt 21 and educational cards 20 to permit adjustment and alignment thereof.

FIGS. 2 to 4, inclusive, illustrate one preferred construction of the carrier belt 21. As shown, the belt 21 is preferably comprised of an interconnected series of semi-rigid sheet sections 32, 33, 34 and 35, each being connected to the next in sequence at a flexible edge joint, such as 36 and 37, that permits that section to fold in one direction only and overlie the next succeeding section; with the next succeeding section adapted to fold or hinge in the opposite direction only over its succeeding section whereby the overall carrier belt 21 is permitted to fold or collapse only in a fan folded or accordion folded fashion as is desired.

According to one inexpensive manner of constructing the carrier belt 21, the individual sections 32, 33, and the like are each formed of thin semi-rigid paperboard or plastic having dimensions of 4 by 6 inches and having a thickness of about .007″. These sections are abutted edge to edge, and each pair is hinged together at its abutted edges on one side only, by a plastic hinging tape 38, of about .003″ in thickness and having greater flexibility than the individual sections of the belt. The flexible hinging tapes 38 are placed on alternately opposite surfaces of the joints for each succeeding pair of sections as best shown in FIG. 3, whereby the carrier belt 21 will be compelled to collapse or fold in the accordion pleated manner desired since the abutted edges of the individual sections taken with the hinge tape 38 prevent folding at each joint other than in the desired direction. If desired, both the individual sections 32, 33, and the like, as well as the hinge tape 38 may be made of a flexible thermosetting plastic material such as polyvinyl chloride sheeting, with the belt sections being made of thicker stock material than the hinge tape 38 to promote hinging as desired at the edges. In this instance the edge tapes 38 may be heat-sealed to the sections to provide the desired strength at the flexible joints.

For transporting the transport belt 21 through the machine, the outside edges of the belt along its length are perforated with uniformly spaced sprocket holes 39 that are adapted to be engaged by a drive sprocket in the transport mechanism as will be discussed more fully hereafter.

For supporting the individual cards 20 on the different sections of the transport belt 21, a pair of pockets, indicated as 40 and 41, are provided on the outside edges of each section, as best shown in FIG. 4, whereby the opposite edges of each card 20 are slipped into these pockets 40 or 41 to detachably retain the cards 20 on the carrier belt 21. As shown in FIG. 4, the pockets 40 and 41 are preferably formed by wrapping and fastening sections of tape along these opposite edges lengthwise along the section, with each such pocket forming tape having an unconnected flap extending inwardly over the section for a short distance and overlying a portion of the section to form therewith an edge envelope 40 and 41 to receive the edge of the card 20. These pocket forming tapes 40 and 41 are preferably made of fiber reinforced plastic for strength and having about the same thickness as the carrier belt section. Since these envelope forming tapes 40 and 41 are wrapped around the outside edges of the sections of the carrier belt 21, they are also perforated at 39 to receive the teeth of a drive sprocket, and serve to also reinforce the carrier belt 21 and prevent tearing of carrier sprocket holes 39 by the teeth of the drive sprocket. These latter tapes 40 and 41 may also be formed of thermoplastic material and may be heat-sealed to the carrier belt sections to provide the required strength.

For making electrical contact through the carrier belt 21, the individual sections of the carrier are each provided with an elongated slot 210 or other suitable opening therein whose function will be discussed hereafter.

The individual cards 20, as generally shown in FIG. 5, may be inexpensively formed of relatively thin semi-rigid paperboard or plastic as may be desired. According to this first embodiment, each card is provided with an enlarged space 12 for receiving the printed or written question or other educational stimulus, which space 12 is adapted to be viewed through the large viewing window 11 in the teaching machine housing 10. Beneath the space 12, there is provided a series of additional spaces 45, 46 and 47, one for each selection button, for receiving the written multiple answer indicia or other response to be selected by the student. These latter spaces are adapted to underlie and be viewed through the transparent selection buttons 13, 14 and 15 as discussed above. For operating the lamp indicators and score counter 16 and for automatically controlling the transport of the carrier belt 21 through the machine, the cards 20 are also provided with a pair of electrical contacts, such as 48 and 49, for each of the multiple choice answers, with each pair of contacts being located above the related answer and in a position to be engaged by corresponding electrical contacts located on the buttons overlying that answer for making electrical contact therewith.

FIGS. 7, 8 and 9 illustrate three alternative modifications of the housing and card magazine storage structures according to the invention together with the manner of feeding or transporting the cards 20 in sequence through the machine on the movable transport belt 21. In the first embodiment shown in FIG. 7, the detachable magazines 51 and 52 are both disposed within the outer housing 10 to provide the most compact arrangement for a desk top machine. As shown, the feed magazine 51 is disposed horizontally within the housing 10 with its outlet facing forward into a guide channel, generally designated 53. For feeding the educational cards, the forward end of the transport belt 21 is initially guided through the channel 53 and onto the surface of an upwardly inclined platen 54 thereby to be engaged by the teeth of a rotatable sprocket drive 55 for engaging the belt 21 and transporting the belt 21 upwardly along the inclined platen 54 thereby to successively bring the educational cards 20 beneath the viewing window 11 as is desired. Upon continued movement of the carrier belt 21 past the rear end of the platen 54, the leading edge of the belt 21 drops by gravity into the vertically disposed storage magazine 52 where its alternate folding action causes the sections of the belt 21 to naturally fold in accordion fashion as shown thereby to store the educational cards, one above the other, in the storage magazine 52.

FIG. 8 illustrates an alternative teaching machine construction, similar to that of FIG. 1, and adapted for table top use, but being provided with considerably longer, detachable magazines 22 and 23 for storing and feeding a much greater number of educational cards 20. In this construction, both the feed and storage magazines 22 and 23 are vertically disposed beneath the housing 10 with the feed magazine 22 extending beyond the front edge of the table 59 and overhanging the top of the table 59. The rear magazine 23 rests on the table top, as shown. In a manner similar to that of FIG. 7, the transport belt 21 is guided over the surface of an inclined platen 56, driven by a sprocket drive (not shown), and is adapted to fall downwardly and self-assume a fan folded storage position in the receiver magazine 23, as shown.

In the preferred construction of the transport belt 21 as described above, the educational cards 20 and the belt 21 fold at a density of about 30 to 40 frames or cards per inch depending upon the thickness of the cards and belt 21 as well as that of the hinging tape 38. A typical desk model of the machine as shown in FIG. 7 and having dimensions approximating the size of a customary desk calculator possesses a capacity of about 240 frames or educational cards. In the embodiment of FIG. 8, employing considerably larger storage magazines 22 and 23, approximately 400 to 500 educational cards 20 may be stored and transported through the machine.

To provide a machine having a much greater card storage capacity, the machine may be constructed to be self-supported on an adjustable height stand as shown in FIG. 9. In this embodiment, the machine housing 10 is centrally supported on an adjustable length vertical center post 60, which may be of the telescoping variety, as shown; with this post 60 being stably maintained in upright position by an extended and weighted platform 61 resting on the ground. In this console like construction, the card storage magazines 63 and 64 may be greatly lengthened to provide a capacity for storing cards on the order of about 1500 frames or educational cards.

Figure 10:
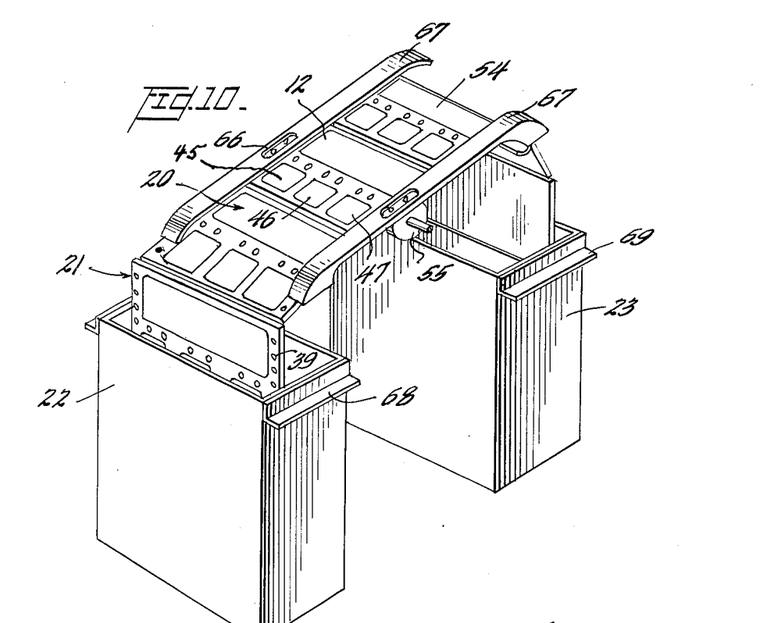
FIG. 10 is a perspective view of some of the interior parts of the machine of FIG. 9, and illustrates the manner of storing and feeding the cards on the transport carrier for selective viewing.
Figure 11:
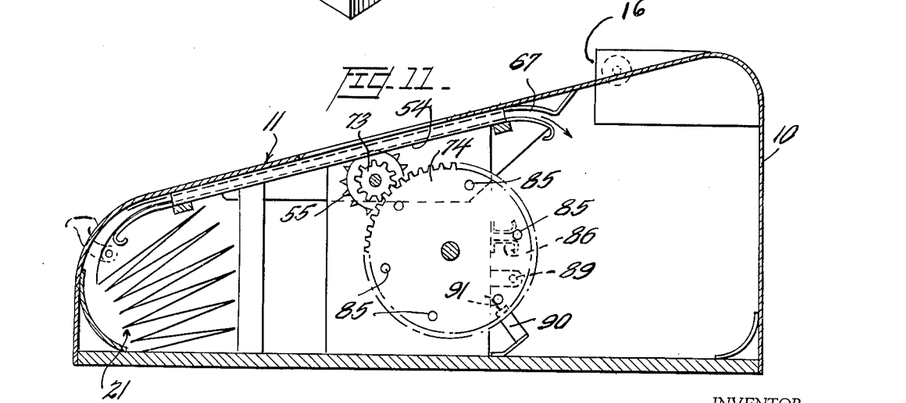
FIG. 11 is a cross-sectional view of the embodiment of FIG. 7, illustrating details of a preferred mechanism for transporting and storing the card carrying belt.
Figure 12:
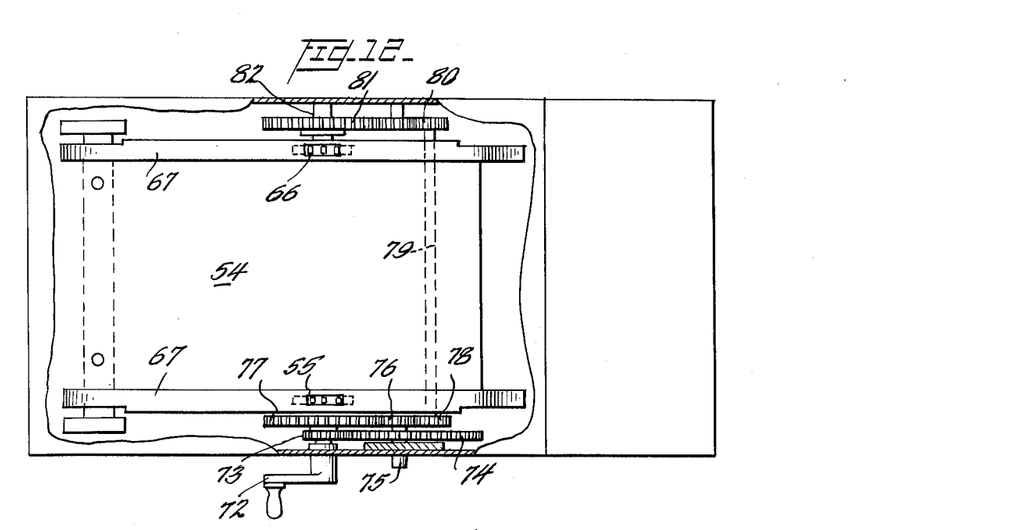
FIG. 12 is a plan view, partly in section, of an embodiment similar to FIG. 11, and illustrating further features of the guiding and feeding means for the carrier belt.

FIGS. 10, 11 and 12 show further details of the preferred belt transporting mechanism for selectively feeding the educational cards 20 through the teaching machine. As shown in FIG. 10, a pair of drive sprocket wheels 55 and 66 are positional on opposite sides and underneath a plate 54 that forms the platen or ramp for supporting the foldable transport belt 21 beneath the viewing window 11. The outer sides of the ramp 54 are folded over to form channels 67 for receiving the transport belt 21 and guiding the belt 21 over the drive sprockets 55 and 66, having teeth that extend through suitable openings in the channels, as shown. The drive sprockets 55 and 66 are adapted to be rotated by either manual or motor drive means and their tooth form and spacing coincide with the sprocket holes 39 in the transport belt 21.

The transport belt is initially stored in the magazine 22 in fan folded fashion; and for insertion into the drive mechanism, the forward end of the belt 21 is inserted into the guide channels 67 for engagement by the teeth of the drive sprockets 55 and 66. For ease in inserting the transport belt 21, the ramp 54 may be hinged (not shown) for positioning the ramp 54 away from the teeth of the drive sprockets 55 and 66 whereby during insertion of the belt 21 into the channels 67, the belt 21 clears the sprocket teeth. After insertion of the belt 21, the platen 54 is then lowered, permitting the sprocket teeth to engage the perforations 39 in the belt 21. As generally discussed above, the outer housing 10 is pivoted at 28 to expose the mechanism shown in FIG. 10, thereby permitting the threading of the belt 21 onto the ramp 54 in this manner. After the belt 21 is inserted, the housing 10 is lowered to the position shown in FIG. 1 whereby the indicia 12 and 45, 46 and 47 on the educational cards 20 is viewable through the transparent window 11 in the housing 10 and through the transparent buttons 13, 14 and 15, respectively. When the transport belt 21 has been completely driven through the machine, the drive mechanism may be reversed to return the belt 21 and cards from the receiving magazine 23 back to the feed magazine 22 thereby preparing the teaching machine for a new sequence of operations. As shown in FIG. 10, each of the magazines 22 and 23 may be provided with outstanding flanges 68 and 69, respectively, for enabling these magazines to be detachably supported in place on the machine base frame members 25 and 26 (see FIG. 1).

FIGS. 11 and 12 illustrate additional features of the sprocket driving mechanism for transporting the carrier belt 21. As shown, the mechanism may be adapted for manual actuation by a hand operated crank 72 that may be rotated for one complete revolution for bringing each succeeding educational card 20 into position beneath the viewing window 11. The hand crank 72 is connected to rotate a small pinion gear 73 that meshes with a larger spur gear 74 whereby one complete revolution of the hand crank 72 advances the large spur gear 74 by an angle of 60°. Located on the same shaft 75 is an inner spur gear 76 that meshes with a gear 77 being connected by a shaft to rotate the drive sprocket 55. The gear ratios involved are such as to advance the transport belt 21 by one frame or one educational card 20 for each complete revolution of the hand crank 72. The sprocket drive 66 at the opposite side of the transport belt 21 is driven in synchronism with sprocket 55 by means of a positive drive gear connection including spur gear 78, shaft 79, pinion gear 80 and driven gear 81, the latter being connected by means of shaft 82 to rotate the opposite sprocket 66.

For synchronizing the transport belt position with the viewing window 11 and locking the drive mechanism after each revolution of hand crank 72 the large drive gear 74 is provided with six outstanding spaced detents 85 disposed on one side surface of the gear 74 and spaced at equal 60° displaced positions about the gear. The frame structure of the machine is provided with a single detent stop 86 which is adapted to resiliently engage each of the detents 85 on gear 74 successively at the completion of each 60° displacement of the gear 74. As will be recalled, the gear 74 is adapted to be displaced by 60° for each complete revolution of the hand crank 72 bringing the next succeeding educational card 20 into view beneath the housing window 11. Consequently, as each card 20 is brought into view a detent 85 engages the detent stop 86 to retain the transport mechanism in this synchronized position. In addition, the gear 74 is adapted to be locked in each of these 60° synchronized positions by means of an electrical solenoid operated locking means 89 being supported on the housing frame. This solenoid locking means 89 is released to enable the next succeeding educational card 20 to be advanced only after the student has made the correct response to the previous stimulus card, all as will be discussed more fully hereafter.

For counting the number of frames of cards 20 that are positioned in the viewing window 11, an electrical microswitch 90 is also provided within the housing 10 and supplied with an elongated arm actuator 91 adapted to be successively engaged by each of the detents 85 on the gear 74 as the gear 74 rotates through each 60° angle. The switch 90 is electrically connected to energize a suitable counter (not shown) upon each actuation thereof, thereby to provide a count of the number of frames or cards presented to the student.

Figure 13:
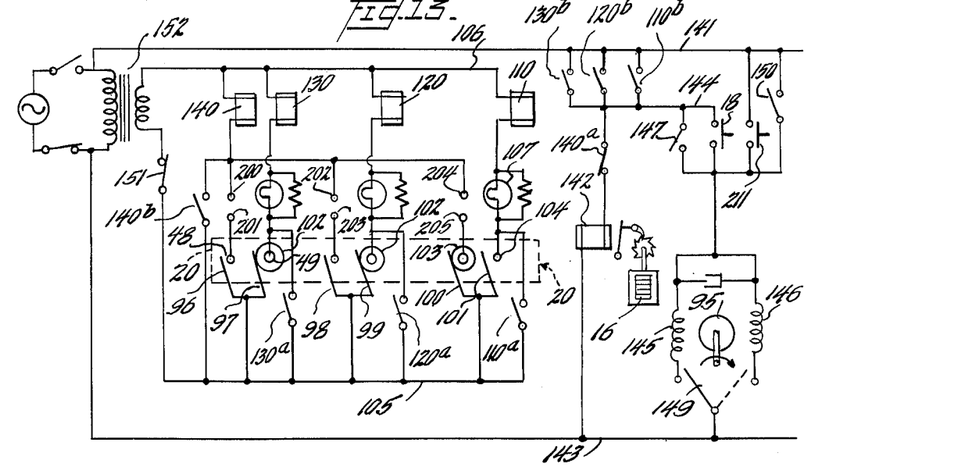
FIG. 13 is an electrical schematic drawing of the electric controls for the card feed, indicator, and counter mechanism for a machine operating in the multiple choice question and answer mode.

FIG. 13 schematically illustrates a complete electrical system for the preferred teaching machine including the electrical means responsive to the student's depressing the correct one of the response buttons 13, 14 or 15 for rewarding the student by energizing a light indicator or other signal means as well as operating the counter mechanism 16 (FIG. 1) to add one count for each correct response. In addition, the electrical system controls the solenoid lock 89 (FIG. 11) for enabling the machine to be advanced to the next card only upon the student making the correct response to the question. The electrical system of FIG. 13 also illustrates the controls for an electrical motor 95 for automatically transporting the card carrier belt 21, in substitution for the hand crank 72, as discussed above, whereby the teaching machine functions completely automatically in response to the student's actuation of the correct response button. For automatic motor control of the machine, the shaft of motor 95 is connected directly, or through appropriate gearing, to rotate the large drive gear 74 and thereby advance or retract the transport belt 21 in the same manner as may be provided by the hand crank 72.

Referring to FIG. 13, each of the multiple choice transparent buttons 13, 14 and 15 (FIG. 1) of the machine is provided with a pair of electrical contacts that are adapted to overlie the pair of electrical contacts on the educational card 20 (FIG. 5). Thus, the electrical contacts 96 and 97 associated with the first button 13 overlie the second pair of contacts on the card 20; and the contacts 100 and 101 on the third button 15 overlie the third pair of contacts on the card 20. Upon any one of these buttons being depressed, the pair of contacts thereon, electrically engage that associated pair of contacts on the card 20 to pass current therethrough.

According to the invention, only one of the three answers or responses to each stimulus 12 is the correct response and, therefore, the right hand contact of each incorrect response on the card 20 is covered with an insulator disc 102 (see FIG. 6), that may be adhesively applied over that contact at the time that the written indicia 12 is applied to the card. For the correct response, however, the left hand contact is insulated, as indicated at 103, rather than the right hand contact. Thus in the card 20 shown in FIG. 13, it is noted that the furthermost right hand button 15 provides the correct response to the stimulus, and the buttons 13 and 14 both provide incorrect answers or responses. It is further noted that these electrical contacts are not visible through the transparent buttons 13, 14 and 15 so that the student cannot determine the correct answer by noting the positions of the insulators selectively over the contacts.

Presupposing that the student makes the correct choice on the first try and depresses the correct button 15, in this example, electrical connection is made from the power line 105 and through right hand contact 101 on button 15 and contact 104 on the card 20 to energize a light bulb indicator 107 and energize a relay coil 110 leading to the other power line 106. Illumination of the light bulb 107, which may be disposed below the button 15 illuminates the button 15 to immediately reward the student by indicating that he has made the correct choice or response to the stimulus. Concurrently the relay 110 is energized to close its holding contact 110a for maintaining the lamp 107 and relay 110 in energized condition after the student releases the button 15.

Additionally, a second contact 110b of relay 110 is closed to perform two additional functions. In the first additional function, the closing of contact 110b enables current flow from the power line 141 and through contact 110b and through normally closed contact 140a to energize the counter solenoid winding 142 whose opposite terminal is connected to the other power line 143. The solenoid 142 thereby operates the counter 16 located on the face of the housing 10 (see FIG. 1) to add an additional score thereby further rewarding the student by indicating the addition of a correct answer.

In the second additional operation being performed by relay 110, the power is transferred from line 141 and through contact 110b to line 144 leading to the motor drive windings 145 and 146, whereby if either of switches 147 or 18 connecting the line 144 to the motor 95 is closed, the motor 95 is energized to operate the transport belt mechanism and advance the next education card 20 beneath the viewing window 11. If it is desired to condition the machine for fully automatic operation, the switch 147 is normally maintained closed whereby the energization of relay 110 immediately operates the motor 95 to advance the next educational card beneath viewing window 11. On the other hand, if it is desired that the student control the advance of the cards 20, then the switch 147 is left open and the student need merely depress the jog button 18, located on the face of the housing in FIG. 1, to advance the next card 20 into position.

As shown, the motor 95 is provided with two energizing windings 145 and 146 adapted to be selectively connected in circuit by a selecting switch 149. Winding 145 energizes the motor 95 for forward rotation whereas winding 146 provides the reverse rotation. Switch 149 is not made accessible to the student, but the instructor may position switch 149 to enable either forward or reverse feeding of the transport belt 21, as desired. Thus, upon the student depressing that button indicating the correct response on the first try, the student is immediately rewarded by the lighting of an indicator, by the addition of one count to the score counter 16, and by the machine automatically advancing the transport belt 21 by one frame to register the next card 20 underneath the view window 11. Alternatively, in addition to the indicator and counter being energized, the machine is conditioned for the next card 20, and may be advanced to the next card by the student depressing the jog button 18 located on the upper surface of the housing.

In the example above, it was presumed that the student's first response was correct. Presupposing instead that the student initially depressed either of the incorrect buttons, such as the left hand button 13, then the sequence of operations differs. Upon button 13 being depressed, power is applied from power line 105 and through engaging contacts 96 and 48 to energize error relay 140. The energization of error relay 140 closes its contact 140b to maintain the relay 140 in energized condition and additionally opens the normally closed relay contact 140a. This latter contact 140a is in series with the solenoid 142 for score counter 16 and, therefore, the opening of this relay contact prevents the counter from being subsequently actuated. Thus, upon the student initially making an incorrect choice, the indicator lights are not energized, the counter 16 is not operated, nor does the machine automatically advance the next card into view, all of which makes it evident to the student that his choice has been incorrect.

If, on the second try, the student depresses button 14, which is also incorrect, no further response of the machine takes place since the contact 98 of button 14 merely connects the lower power line 105 to error relay 140 which has already been energized through holding contact 140b, as discussed above.

Since only one button 15 remains, the student is then aware that the correct response is viewed through remaining button 15 and accordingly depresses this button. Upon doing so, the indicator light 107 is energized confirming his knowledge of the correct answer and the relay 107 is also energized to automatically or semiautomatically advance the next card 20 to the window 11 as discussed above. However, the score counter 16 cannot be operated to add a correct count since the error relay contact 140a has been previously opened in response to the student's initial incorrect choice. Thus, in the event that the student does not make the correct choice on the first try, the counter 16 does not add a correct response to his score. Additionally, the student is required to continue making choices of answers until the correct answer or response is finally obtained in order to have the machine advance to the next frame. This latter function is recognized as being essential to the learning process by educators and psychologists.

For controlling the motor 95 to advance only one frame or card for each function, there is provided a microswitch contact 150 connecting the upper terminal of the motor windings 145 and 146 to the upper power line 141. This microswitch 150 is adapted to be closed upon the motor beginning its rotation and to automatically open after the predetermined number of revolutions of the motor necessary to advance the next frame or card beneath the viewing window 11. To perform this function the switch 150 may be actuated by a cam (not shown) or other equivalent and well known mechanism. Thus, upon the relay's functioning as described above to initiate operation of the motor 95, the switch 150 functions to automatically maintain the motor energized until the next succeeding frame or educational card is advanced into viewing position whereupon the switch 150 is opened to deenergize the motor.

For resetting the relays during the transport of the next card 20 into position, the electrical system is also provided with a switch 151 located in series with the power line 105 energizing the relays. The switch 151 is normally maintained in closed position, as shown in FIG. 13, and is adapted to be actuated to open its contacts upon the motor 95 commencing operation. The opening of switch 151 deenergizes all of the previously energized relays to restore the circuit to its initial condition. If desired, the switch 151 may be actuated by the same cam or related mechanism (not shown) that controls the switch 150 whereby upon the succeeding frame being positioned in the viewing window, the switch 151 is again permitted to close to its normal condition thereby readying the teaching machine for the next sequence of operations. As will be noted from FIG. 13, the power lines 105 and 106 for energizing the relays and indicators are isolated from the power lines 141 and 143 for energizing the motor windings 145 and 146, by means of a transformer 152 whereby opening of the switch 151 deenergizes the relays without disconnecting the power to the motor 95.

Figure 14:
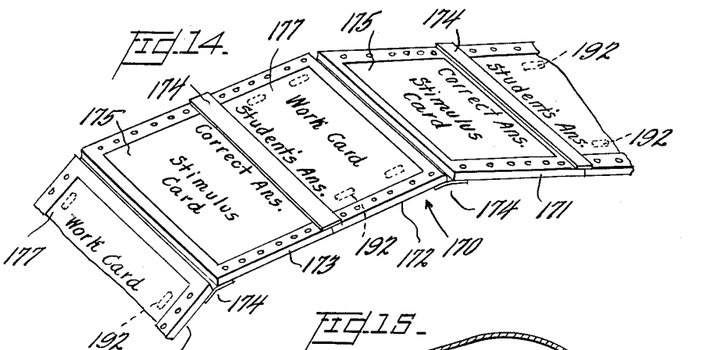
FIG. 14 is a perspective view of the card carrier belt and of the cards for a machine operating in the written response mode of operation.
Figure 15:
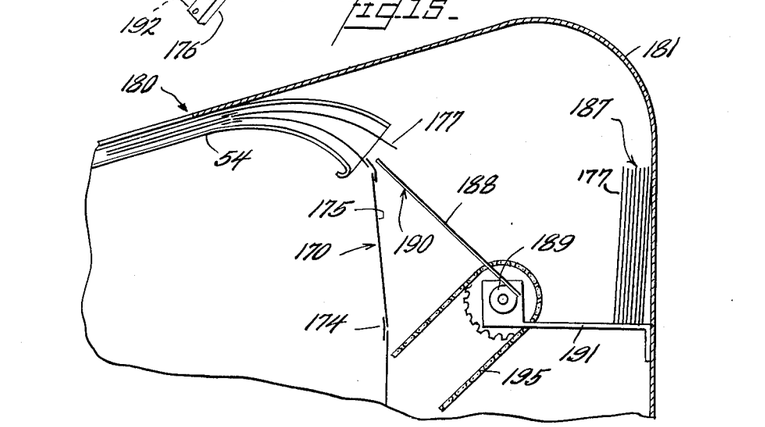
FIG. 15 is a partial cross-sectional view of a machine operating in the written response mode and illustrating one manner of separating the word cards from the stimulus cards.
Figure 16:
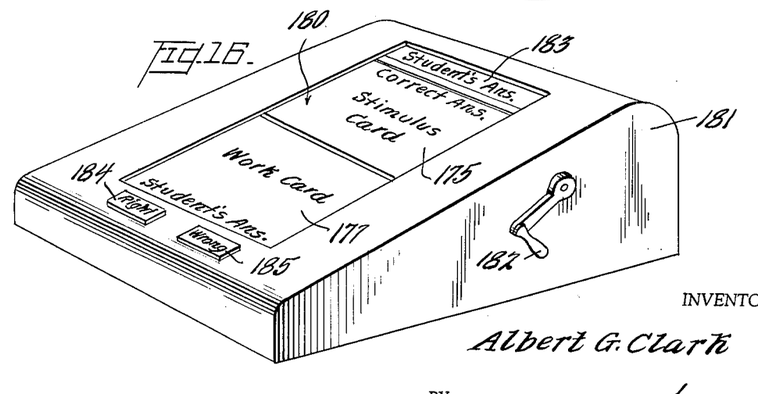
FIG. 16 is a perspective view similar to FIG. 1 and illustrating the outer configuration and controls of a machine operating in the written response mode.

FIGS. 14 to 16, inclusive, illustrate a modified form of the card transport belt and educational cards together with other changes for providing a teaching machine that is adapted for written response by the student.

As illustrated in FIG. 14, the card transporting belt 170 may be very similar to that of FIGS. 2 to 4, comprising an interconnected series of semirigid sections 171, 172 and 173 disposed in edge-to-edge abutted relationship and being alternately connected on opposite sides by flexible tape strips 174, permitting the belt to fold only in an accordion fashion, as desired.

Supported on every odd numbered alternate frame, such as on frames 171 and 173, there is provided a stimulus card 175 that contains printed or written indicia, such as a question, a problem to be solved, or the like. Immediately above this stimulus indicia on these cards 175, there is printed the correct answer or response to the preceding stimulus card 175. On every even numbered alternate frame, such as on frames 172 and 176, there is supported a work card 177 that is usually blank and is provided with a large central space or area for the student to write on in solving a problem or in otherwise preparing a response to the preceding stimulus card. Below this blank space on the work card 177 there is provided a smaller space for the student's answer or conclusion, as shown. Thus the correct answer or response to the previous stimulus is located near the top edge of the stimulus card 175 and the student's answer to the same question is located in proximity thereto near the lower edge of the preceding work card 177.

Referring to FIG. 16 for an understanding of the manner of employing this transport belt 170 and cards in the teaching machine, it is noted that in this embodiment the transparent viewing space 180 being provided in the machine housing 181 is more than twice larger than the individual cards, permitting both a stimulus card 175 and its associated work card 177 to be both viewed simultaneously through the opening 180. Thus the student observes the written material on the stimulus card 175 and is directed to work out his response to the problem by writing on the blank work card 177 and finally preparing his answer or conclusion in the space provided near the base of the work card 177, as shown.

For immediately rewarding the student after his answer is completed, he is instructed to advance the carrier belt 170 to the next two frames by rotating the hand crank 182 for one revolution if the machine is manually operated or by depressing an advance button (not shown) if the machine is motor driven. As shown, the length of the window opening 180 is extended beyond the length of the two cards 175 and 177 such that the student's final answer, indicated at 183, on the previous work card 175 remains visible at the top edge of the window 180 after the two new frames have been advanced into view. Thus near the top edge of the window 180, the student may observe his answer or response at 183 to the previous stimulus as well as the correct answer to this stimulus located a short distance below on card 175 thereby being immediately informed whether his response is or is not correct.

In the event that his written response is correct, the student then depresses a button 184 labeled "right" to operate an audible buzzer, electric light or other indicator as well as operating a score counter, such as 16 in FIG. 1, to add one count for the correct answer. The button 184 also may operate an electrical switch (not shown) to release a solenoid lock, such as 75 in FIG. 11, thereby to release the transport mechanism and condition the machine to permit further advance of the transport belt 170 upon the crank 182 being rotated or upon the student depressing an advance button, such as button 18 in FIG. 1, to energize a motor drive.

On the other hand, if the student's answer or response to the previous stimulus is incorrect, he is instructed to depress a second button 185, labeled "wrong." In this case, the transport belt 170 is immediately retracted (if motor driven) to return the previous pair of stimulus card 175 and work card 177 back into the viewing opening 180 for enabling the student to discover where his error was made, and rework the problem, if necessary. Upon being satisfied that the previous problem or stimulus has been mastered, the student may then depress the "right" button 184 and advance the belt to the next stimulus as discussed above.

As is generally indicated above, if the machine is manually operated by means of a hand crank 182 as shown, then the depression of the "right" button 184 unlocks the machine, by a solenoid or the like, to enable the transport belt 170 to be advanced upon the student later rotating the hand crank 182 by one revolution. Similarly, if the student depresses the "wrong" button 185, the machine is also unlocked but only to the extent of enabling the student to reverse the direction of movement of the transport belt 170 and return the previous two cards 175 and 177 beneath the viewing opening. If the machine is motor driven, the sequence of operation is substantially the same except that the transport belt 170 is advanced or retracted by depressing a button, such as 18 in FIG. 1, instead of rotating the hand crank 182.

As will be evident, in this embodiment the machine does not prevent the student from cheating by grading himself "right" when his response is actually "wrong." However, once the student depresses the "right" button 184 the machine will only permit advancing the transport belt 170 forward to the next two frames and will not provide the student with access to his previous work card 177 which can only be obtained when the student grades himself "wrong." Since all of his previous work cards 177 are stored in the machine, the instructor may independently grade the student's work by removing the complete transport belt 170 from the machine after the student has completed the entire program. On the other hand, the student has access to his previous work cards and may correct these by grading himself "wrong" for each self "wrong." Since all of this previous work cards 177 would not indicate the incorrect answers for grading purposes but the score counter (as 16 in FIG. 1) would provide a total of the correct answers on the first try and therefore provides the instructor with the student's grade. Alternatively a second score counter (such as 16 in FIG. 1) may be provided that is actuated by each depression of the "wrong" button 185 thereby to maintain an accumulated count of the total number of incorrect answers or responses.

As is believed now evident, the stimulus cards 175 are reusable over and over again by different students without the need for removing these cards 175 from the transport belt 170 whereas the work cards 177, upon which the student writes his response, may be inexpensive and expendable, and adapted to be replaced by blank work cards 177 after each program has been completed by a student. For automatically removing the work cards 177 from the belt 170 after use, the teaching machine may be provided with an inexpensive separating device as shown in FIG. 15 for separating the work cards 177 and storing these in an independent stack within the machine after the transport belt 170 has advanced these cards past the platen 54. To perform this function, the machine may be provided with a thin separating finger 188 pivotally supported near its upper end at 190 close to the transport belt 170 and being cam actuated at its lower end at 189 to pivot upwardly about 190 in synchronism with the manual or motor drive. This finger 188 forms an inclined ramp for receiving and guiding the work cards 177 away from the belt 170 and onto a platform 191 where the separated work cards 177 are stored in a stack.

For cooperating with this separating mechanism, the work cards 177 are detachably supported on the transport belt 170 only by small magnets 192, as shown in FIG. 14, which may be laminated in the belt 170 and engaged with a thin magnetic coating (not shown) on the rear of the work cards 177. These magnets 192 are displaced inwardly from the edges of the cards 177 whereby upon the belt 170 proceeding at an angle downwardly after leaving the platen 54, the edges of these relatively stiff cards extend outwardly away from the downward feeding belt 170 and over the separating finger 188. Continued movement of the transport belt 170 downwardly into its storage magazine draws the work cards over the separating finger 188 to disengage from the belt 170 whereupon these cards 177 slide down over the finger 188 and are deposited in the stack 187. The lower edge of the finger at 189 is intermittently raised by the cam at 189 in synchronism which each received work card 177 thereby guiding the card 177 to an upright position in the stack 187, as desired.

The stimulus cards 175, on the other hand, may be supported on the transport belt 170 by means of pockets 40 and 41 of the same type as shown in FIG. 4, whereby the forward edges of these latter cards 175 do not project over the separating finger 188 as the transport belt 170 leaves the platen 54. Consequently, the stimulus cards 175 remain with the belt 170 and are stored in the magazine as the belt assumes the fan folded position shown in FIGS. 7 and 8.

By providing a suitable door (not shown) in the rear of the housing 181, the stack 187 of work cards 177 may be thereafter separately removed from the machine for grading or the like.

Returning to FIG. 15, the cam mechanism 189 may be driven in synchronism with the transport belt 170 by means of a driving belt 195 connected to be actuated by the hand crank 182 or motor. Thus as each work card 177 is removed from the belt 170 by the separating finger 188 or plate, the lower edge of the finger 188 is raised by the cam 189 to deposit the work card 177 in the separate stack 187, as desired.

As is evident from the preferred construction, the use of individual semiflexible cards provides larger spaces for the storage of indicia, and for written response, which spaces can approximate or be larger than the size of a page of a standard text book. Since the cards are formed individually, they may be arranged in any programmed sequence as desired by the instructor, which sequence may be easily revised for different students. Such changes may not be made with a continuous educational tape of known varieties.

Additional, the instructor may himself originate and prepare the indicia on the individual cards according to his own program or he may revise and substitute only certain of the cards, if he so desires. This provides the instructor with a much greater freedom in selecting the subject matter and the program for teaching the student since he is not required to rely upon previously prepared cards being purchased from a central educational publisher or other source which may not be adaptable to his teaching methods or to the needs of his classroom. On the other hand, if the instructor can obtain the subject matter needed in the form of prerecorded cards from a publisher of such cards, such published cards may be used in toto or may be combined with cards originated by the instructor to develop the particular learning or responses desired.

In addition to these desirable features, the preferred teaching machine construction provides a considerably less expensive and less complex mechanism for storing and feeding the educational cards than the known pneumatic, electrical or electro-mechanical devices for card sorting and feeding. It is well known that the present costs of education or quite large and the operating budgets and resources available to schools continually lag behind the need for facilities. As a result one of the major deterrents to the more widespread use of teaching machines is the relatively high cost of known card feeding machines taken with the large numbers of such machines that are needed to adequately supply even one classroom. Consequently, the greatly reduced cost and considerably greater simplicity of the card transporting means of the present invention provide the educator with more adequate teaching tools within the limited expense budget available.

Still another feature of the present invention, is its versatility to variable programming as controlled by the instructor. For example, with but minor changes in the machine, it may be adapted to skip or pass over an adjustable number of frames for each operation thereof and therefore teach the bright or more advanced student more rapidly in greater steps. More specifically, for the advanced student, the machine may be adjusted to advance for two or more cards for each operation before stopping thereby skipping or eliminating the intermediate cards. This may be easily performed in a manually operated embodiment by employing an adjustable ratchet mechanism of well known types for actuation by the hand crank whereby the carrier belt may be advanced by more than one frame for each revolution. Similarly in the motor operated embodiments, the same result may be obtained by providing a variable camming mechanism and electrical locking means for operating the switches 150 and 151. Since these variatitons are considered well within the skill of those working in the art in the light of the present specification, further details thereof are not considered necessary.

As described above in connection with FIGS. 1 and 16, a simple score counter 16 may be employed to total the score of correct responses made by the student. However, this counter 16 does not provide an indication of those stimuli which the student has responded to incorrectly and therefore does not provide the instructor with information necessary to aid the student in those areas needing assistance. Of course, in the embodiment of FIG. 16, the instructor may review the work cards 177 and obtain this information but cannot do so in the embodiment of FIG. 1.

To provide the instructor with a record of the student's response to each stimulus, there is provided a recorder means and record tape that may be easily incorporated in the electrical system of FIG. 13. Returning to FIG. 13, it will be recalled that whenever the left hand contact of each pair of button contacts is energized, the student has made an incorrect response and the error relay 140 is energized. Connected in series with each of the left hand contacts in each of the button circuits there is provided a pair of very closely spaced terminals, comprising terminals 200 and 201 for the first button 13; terminals 202 and 203 for the second button 14; and terminals 204 and 205 for the third button 15. Each of these pairs of terminals are positioned closely together and are adapted to engage different positions on a thermosensitive recording tape (not shown) whereby these terminals are in electrical contact with each other through the recording tape. Upon the incorrect choice button being depressed, such as button 13 in the above example, current flows between terminals 200 and 201 through the recording tape to place a marking on the tape. This mark indicates that the erroneous button 13 has been depressed. Similarly, if erroneous button 14 is depressed, a marking is made by energized terminals 202 and 203 whereby if both of buttons 13 and 14 are depressed before the correct selection of button 15 is made, then two marks appear on the recording tape. The recording tape is adapted to be suitably driven in synchronism with the transport belt 21 (FIG. 4) whereby each position along the length of the tape corresponds to a different one of the stimulus cards 20. Accordingly, the student's response to each stimulus card may be determined by noting the number of marks on the recording tape corresponding to that card. If no marks appear, then the student has correctly responded to the stimulus whereas if one mark appears, the instructor is informed of an error and may identify the incorrect response by the position of the marking. Finally, if two marks appear, it is noted that the student has made two incorrect choices to that stimulus. Thus by means of this attachment to the machine, the instructor may rapidly review the student's individual responses to the questions or stimuli and evaluate the program.

Although but preferred embodiments of the invention have been illustrated and described, many variations may be made without departing from the spirit and scope of the invention. Accordingly, this invention should be considered as being limited only according to the following claims appended hereto.

What is claimed is:

1. In a teaching machine, a fan foldable transport carrier for conveying a series of semirigid teaching cards in sequence past a viewable window, said carrier comprising an interconnected series of semirigid sections each being connected at one edge to a succeeding section of the carrier by a connecting means permitting folding of that section in but one direction with respect to a succeeding section and being connected at an opposite edge by a connecting means permitting folding of that section in the opposite direction with respect to a preceding section, each said section of the carrier being provided with means for enabling a teaching card to be detachably supported by that section, and means within the machine for selectively driving said carrier past said window, said cards each being coded to provide a correct response to a stimulus thereon, and detecting means supported by the machine for detecting the correct response on said card without interference from said carrier.

2. In the teaching machine of claim 1, said sections of said carrier being of electrically nonconducting material and said carrier sections being provided with openings therethrough for enabling electrical connections to be made through the carrier.

3. In a teaching machine for intermittently displaying individual teaching cards through a viewing window, a fan foldable elongated carrier for supporting a plurality of such teaching cards, a feed magazine and a storage magazine for said carrier, a drive mechanism for transporting said carrier through the machine for selective viewing of the cards through said window, a plurality of buttons adapted to be selectively depressed by the student, and means interconnecting said buttons and said drive mechanism to permit movement of said carrier only upon the proper button being depressed, said cards being coded with correct answer indicia, and detector means in said interconnecting means between said buttons and drive means to detect the coding on the cards despite the presence of the carrier and without disturbing the support of the cards on the carrier.

4. In the machine of claim 3 functioning in the multiple choice mode of operation, reward means for signaling the student immediately upon his making the correct choice, said reward means including a score counter adapted to be energized only upon the student making the correct choice on the first selection and including light indicators for each of the buttons and an electrical control circuit for energizing the indicator associated with the correct button upon the student depressing the correct button.

5. In a teaching machine functioning in the multiple choice mode of operation, an elongated transport carrier comprised of a plurality of interconnected sections adapted to fold over one another, each section detachably supporting an individual teaching card, carrying stimulus and different response indicia, a drive mechanism for positioning the transport carrier, a plurality of multiple choice selectors, one for each of the response indicia, reward means for signaling the student immediately upon his making a correct choice by depressing that selector corresponding to the correct response indicia, and means for enabling the instructor to evaluate the incorrect choices made by the student, said evaluating means including a mechanism for separately identifying and recording each incorrect response to each stimulus.

6. In the machine of claim 5, said evaluating means comprising a record means positioned in synchronism with said transport carrier and marking means interconnecting said selectors and said record means for providing a marking on said record for each incorrect response to the stimulus.

7. In a teaching machine functioning in the multiple choice mode of operation for selectively displaying a plurality of individual cards each having a stimulus and multiple responsive indicia, a plurality of individually actuable members, one for each of the response indicia and only one of which constitutes the correct response to the stimulus, a containuous card carrier for supporting and conveying the cards through the machine, said cards being each detachably supported on the carrier whereby the individual cards may be replaced and varied to change the indicia thereon without varying the other cards; and wherein the program and sequence of cards may be easily varied by the instructor, a mechanism for reversibly transporting the carrier through the machine thereby to selectively present the cards to the student and permit any desired sequence of cards to be repeated, means responsive to actuation of the member corresponding to the correct response indication for conditioning the transport mechanism to advance the carrier to a succeeding card, and indicator means responsive to actuation of the member corresponding to the correct response for immediately rewarding the student by providing a signal.

8. In a teaching machine for successively presenting individual cards to a student in a predetermined sequence, an elongated carrier belt comprised of a plurality of interconnected hinged sections each adapted to detachably retain a card, a carrier transport means for said carrier to reversedly advance the carrier through the machine, a plurality of movable members adapted to be selectively actuated by a student using the machine, said members being associated with said transport means whereby upon actuation of a preselected one of said members by the student said transport means is conditioned to position the carrier, said carrier supporting a first series of stimulus cards on even alternate sections of the carrier and a second series of work cards on odd alternate sections of the carrier, and being disposed within the machine to simultaneously display both a stimulus card and work card to the student, each stimulus card bearing indicia representing the correct answer to a preceding stimulus and each work card preceding that stimulus card having a space near the correct response indicia on the stimulus card for the student to apply this response to the previous stimulus, said machine having a viewing opening for permitting observation of both the stimulus card and its associated work card together with the student's response on the preceding work card whereby the student may compare his response to the correct response, and said members comprising means for enabling the student to grade the correctness of his response whereby upon actuation of one of said members indicating the correct response, the transport means is conditioned to advance the carrier.

9. In the machine of claim 8, the addition of means for selectively separating only the work cards from the carrier after each work card has been advanced past the viewing opening, said means additionally positioning said detached work cards for removal from the machine.

10. In the machine of claim 8, said work cards being detachably supported on said carrier by magnetic means, and a separating member within said machine and disposed between the edge of said work cards and carrier upon advance of said carrier beyond a given position in the machine whereby continued advance of said carrier detaches the work card therefrom.

11. In a teaching machine for written response by the student, an elongated carrier comprised of a plurality of hingedly connected sections and adapted to stack in accordion folded fashion, each section supporting an individual card, with a first series of indicia bearing cards being supported on odd sections of the carrier and a second series of substantially blank work cards being supported on even sections of the carrier, a transport mechanism for feeding the carrier from its feed folded position and through the machine to a stored folded position, and members adapted to be selectively actuated by the student for conditioning the transport mechanism to reversedly advance the carrier selectively upon a correct and incorrect written response, indicator means for immediately rewarding the student upon his actuation of the member corresponding to a correct response.

12. In the machine of claim 11, means for selectively separating only the work cards from the carrier and depositing the work cards for access by the instructor, said separating means being responsive to movement of each work card supporting section of the carrier beyond a predetermined position in the machine for selectively separating the work card from that section.

13. In a teaching machine wherein successive stimulus are presented to the user in sequence and means are provided for the user to write in his response to the stimulus, and wherein a correct response is subsequently provided to enable the user to compare his response to the correct response, the provision of self-grading means for enabling the user to record his correct responses and to selectively correct and rewrite his previous response if in error, said self-grading means comprising a correct grade means and an incorrect grade means selectively actuable by the user, the correct grade means being actuable by the user to enable the next succeeding stimulus to be presented by the machine but when actuated preventing the user from access to his previous written response, and the incorrect grade means being selectively actuable by the user to enable his previous written response to be presented by the machine for reworking and correction, and grading means responsive to actuation of one of said grade means for counting the number of actuations of that grade means.

14. In the teaching machine of claim 13, said machine incorporating an elongated carrier and a series of cards detachably supported thereon, said cards containing the stimulus indicia and space for the write-in responses, a transport mechanism for reversibly feeding said carrier through the machine for intermittent presentation of said cards, and said correct grade means being coupled to said transport mechanism to enable the mechanism to advance the carrier in only one direction to present the next stimulus, and said incorrect grade means being coupled to said transport mechanism to enable the mechanism to return the carrier in the opposite direction.

15. In a teaching machine operating in the write-in response mode, an elongated carrier, a series of cards detachably supported on the carrier, a transport mechanism for feeding the carrier to successively present the cards to view, and actuator means associated with the transport mechanism for separating the cards from the carrier after they have been viewed, each alternately spaced card on the carrier being a work card having provision for receiving a written response, and said actuator means selectively separating only said work cards from the carrier to enable the review and grading of the work cards.

16. A teaching machine operating in the write-in mode comprising: a fan folding carrier, and a transport mechanism for reversibly feeding the carrier through the machine, a series of educational cards detachably supported on the carrier for successive viewing by the user, selected ones of said cards bearing stimulus indicia, correct answer indicia, and blank space areas for write-in of responses, and a self-grading mechanism associated with said transport mechanism for controlling the direction of feeding said carrier, said self-grading mechanism including a correct response control and an incorrect response control being selectively actuable by the student, with actuation of the correct response control permitting said transport mechanism to feed the carrier forwardly only, and actuation of the incorrect response control permitting said transport mechanism to feed the carrier backwardly only, and a counter mechanism responsive to actuation of one of said response controls to count the number of actuations thereof.

17. In the teaching machine of claim 16, separator means associated with said transport mechanism for selectively separating from the carrier only the write-in response cards, whereby the write-in responses may be independently evaluated by an instructor together with a review of the counter mechanism to insure that the self-grading by the student is accurate.

18. In a teaching machine wherein a number of individual teaching cards may be successively presented to view selectively in either a forward or backward direction, an elongated carrier comprising a series of interconnected sections, a plurality of teaching cards, each detachably supported on a different section, and a transport mechanism for engaging the carrier and being selectively actuable by the user of the machine to present the individual cards to view in either a forward or backward sequence, said transport mechanism including adjustable means for positioning the carrier to automatically skip cards and thereby present only selected ones of the cards to view, said teaching machine operating in a multiple choice mode of operation and being provided with a number of response selectors being selectively actuable by the user, each of said cards being coded to provide the correct answer to a stimulus, and a detector means controlled by said response selectors for detecting the correct answer coding on the cards without the need for removing the cards from the carrier.

19. In the machine of claim 18, a motor drive for said transport mechanism, selectively controlled operating means interconnecting said detector means and transport means to selectively and automatically condition said transport means to permit feeding of the carrier upon the correct response selector being actuated.

20. In a teaching machine wherein a number of individual teaching cards may be successively presented to view selectively in either a forward or backward direction, an elongated carrier comprising a series of interconnected sections, a plurality of teaching cards, each detachably supported on a different section, and a transport mechanism for engaging the carrier and being selectively actuable by the user of the machine to present the individual cards to view in either a forward or backward sequence, said transport mechanism including adjustable means for positioning the carrier to automatically skip cards and thereby present only selected ones of the cards to view, a counter for counting the number of correct actuations of the response selectors on the first selection for each card, and means for disabling said counter for each card if the correct selector has not been actuated on the first selection.

21. In a teaching machine for presenting a sequence of educational cards to view, a motor driven transport mechanism, an elongated carrier driven by the transport mechanism, said carrier comprised of a series of interconnected fan foldable sections, individual educational cards detachably supported on said sections of the carrier, motor control means being energizable to control the motor to position the carrier for predetermined distance increments, polarity means associated with the motor control for selectively permitting the energization of the motor in either a forward or reverse direction, switch means actuable by the user of the machine to energize said motor control means for positioning the carrier, and overriding switch means being actuable by the instructor to energize said motor control means for positioning the carrier independently of the user's switch means.

22. In a teaching machine having a transport carrier supporting a series of individual teaching cards for successive presentation to the student and multiple choice selectors for enabling the student to respond to a stimulus on each card, a recording means for recording all of the incorrect responses of the student to each stimulus, said recording means including an elongated web transported in synchronism with the carrier, and means responsive to the multiple choice selectors to record each incorrect selection on the web.

23. In a teaching machine employing a number of large individual educational cards presented intermittently in predetermined sequence of programs to the student, means for feeding said cards in succession to the student without contacting the individual cards, said means comprising an elongated articulated carrier having a series of fan foldable sections, each section detachably supporting a card, transport mechanism for engaging the carrier and intermittently feeding the carrier through the machine, and a plurality of selectors individually actuable by the student, said selectors being associated with the transport mechanism to permit the feeding of the carrier intermittently to present a next succeeding card to the student only upon a given one of the selectors being actuated by the student, said machine operating in a multiple choice mode of operation and wherein each card contains a stimulus and a coded correct answer thereto, and said selectors each being associated with a different answer and only one of the selectors being associated with a correct answer, a detector means being associated with said transport mechanism and said plurality of selectors, said detector means sensing the code on said cards without interference from said carrier thereby to energize said transport means in condition for the next intermittent operation when the correct answer selector has been actuated by the student.

24. In a teaching machine employing a number of large individual educational cards presented intermittently in predetermined sequence of programs to the student, means for feeding said cards in succession to the student without contacting the individual cards, said means comprising an elongated articulated carrier having a series of fan foldable sections, each section detachably supporting a card, a transport mechanism for engaging the carrier and intermittently feeding the carrier through the machine, and a plurality of selectors individually actuable by the student, said selectors being associated with the transport mechanism to permit the feeding of the carrier intermittently to present a next succeeding card to the student only upon a given one of the selectors being actuated by the student, said machine functioning in the write-in mode of operation, wherein the cards contain in succession a stimulus, a space for write-in answer, and a correct answer, said selectors comprising a correct answer selector and an incorrect answer selector, and means interconnecting said correct answer selector with said transport mechanism to permit the carrier to be intermittently fed to the next advanced position, and interconnecting said incorrect answer selector and said transport mechanism to permit the carrier to be intermittently fed in the opposite direction to its preceding position.

25. In a teaching machine employing a number of large individual educational cards presented intermittently in predetermined sequences of programs to the student, means for feeding said cards in succession to the student without contacting the individual cards, said means comprising an elongated articulated carrier having a series of fan foldable sections, each section detachably supporting a card, a transport mechanism for engaging the carrier and intermittently feeding the carrier through the machine, and a plurality of selectors individually actuable by the student, said selectors being associated with the transport mechanism to permit the feeding of the carrier intermittently to present a next succeeding card to the student only upon a given one of the selectors being actuated by the student, and actuator means associated with the transport mechanism for separating the cards from the carrier after they have been viewed.

References Cited by the Examiner

UNITED STATES PATENTS

| | | | |
|---|---|---|---|
| 263,974 | 9/82 | Shirk | 40—100 |
| 1,022,744 | 4/12 | Kellum | 40—100 |
| 1,271,247 | 7/18 | Wade | 40—100 X |
| 1,298,417 | 3/19 | Stillwaggon | 88—28 |
| 1,802,622 | 4/31 | Van Ness | 40—100 |
| 1,857,268 | 5/32 | Wirtschafter | 88—28 |
| 2,062,453 | 12/36 | Hastings | 35—9 |
| 2,081,264 | 5/37 | Brenn | 40—100 |
| 2,169,266 | 8/39 | Matter | 35—9 |
| 2,177,638 | 10/39 | Draeger | 88—24 |
| 2,564,089 | 8/51 | Williams | 35—9 |
| 2,586,234 | 2/52 | Kopas | 35—9 |
| 2,691,831 | 10/54 | Jordan | 35—35.2 |
| 2,720,038 | 10/55 | Clark | 35—9 |
| 2,720,137 | 10/55 | Musebeck et al. | 40—64 |
| 2,823,472 | 2/58 | Waller et al. | 40—64 |
| 2,953,859 | 9/60 | Fink | 35—9 |
| 2,965,975 | 12/60 | Briggs | 35—9 |
| 3,056,215 | 10/62 | Skinner | 35—9 |
| 3,057,082 | 10/62 | Wellington et al. | 35—9 |
| 3,096,592 | 7/63 | Schuster | 35—9 |

FOREIGN PATENTS

| | | |
|---|---|---|
| 708,087 | 4/31 | France. |
| 532,737 | 8/31 | Germany. |

EUGENE R. CAPOZIO, *Primary Examiner.*

LEO SMILOW, JEROME SCHNALL, *Examiners.*